(12) United States Patent
Tanaka

(10) Patent No.: US 11,106,402 B2
(45) Date of Patent: Aug. 31, 2021

(54) INFORMATION PROCESSING SYSTEM PROVIDING A PREDETERMINED NOTIFICATION, INFORMATION PROCESSING METHOD, AND SERVER SYSTEM

(71) Applicant: CANON KABUSHIKI KAISHA, Tokyo (JP)

(72) Inventor: Yuya Tanaka, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/984,409

(22) Filed: Aug. 4, 2020

(65) Prior Publication Data
US 2021/0064302 A1 Mar. 4, 2021

(30) Foreign Application Priority Data
Aug. 30, 2019 (JP) .............................. JP2019-158831

(51) Int. Cl.
*G06F 3/12* (2006.01)
(52) U.S. Cl.
CPC .......... *G06F 3/1207* (2013.01); *G06F 3/1273* (2013.01); *G06F 3/1287* (2013.01)
(58) Field of Classification Search
None
See application file for complete search history.

(56) References Cited

U.S. PATENT DOCUMENTS

| 2012/0188599 | A1* | 7/2012 | Kyono | G06K 15/1818 358/1.15 |
| 2012/0327463 | A1* | 12/2012 | Mizuno | G06F 3/1288 358/1.15 |
| 2013/0016393 | A1* | 1/2013 | Oku | H04N 1/32122 358/1.15 |
| 2016/0036820 | A1* | 2/2016 | Yamagami | H04L 63/10 726/26 |
| 2017/0039005 | A1* | 2/2017 | Takemura | G06F 3/1273 |
| 2018/0101336 | A1* | 4/2018 | Onomatsu | G06F 3/1212 |
| 2018/0139343 | A1* | 5/2018 | Igawa | H04N 1/00344 |
| 2018/0293032 | A1* | 10/2018 | Hakamata | G06F 3/1285 |

FOREIGN PATENT DOCUMENTS

| JP | 2004-302955 A | 10/2004 |
| JP | 2004302955 A | * 10/2004 |

* cited by examiner

*Primary Examiner* — Henok Shiferaw
(74) *Attorney, Agent, or Firm* — Venable LLP

(57) ABSTRACT

An information processing system includes a server system receives usage history information and identification information of an image forming apparatus, stores, in a memory, the identification information and user information in association with each other, with the user information including destination information of a notification, and obtains the user information from the memory, based on the received identification information. In addition, from the received usage history information, a value related to image forming based on an instruction from a predetermined application included in an information processing apparatus capable of communicating with the image forming apparatus is obtained, and a notification including predetermined information, based on the obtained destination information can be output. The notification is output in a case where the value does not satisfy a predetermined condition, and the notification is not output in a case where the value satisfies the predetermined condition.

17 Claims, 11 Drawing Sheets

| ITEM | CONTENTS | VALUE (EXAMPLE) |
|---|---|---|
| PRINTER IDENTIFIER | A SERIAL NUMBER OF A PRINTER | ABCD12345 |
| MODEL NAME | A MODEL NAME | ABZ series |
| REMAINING INK AMOUNT | THE REMAINING AMOUNT FOR EACH INK 1. INK REMAINING, 2. NO INK REMAINING, 3. UNKNOWN | BK:1,C:1... |
| PRINTING APPLICATION | THE ID OF A PRINTING APPLICATION APPLICATION "A": 001, APPLICATION "B": 002, ... | 001 |
| PRINTING PAPER TYPE | 1. PHOTOGRAPH PAPER, 2. ORDINARY PAPER, 3. POSTCARD | 1 |
| PRINTING PAPER SIZE | 1. L SIZE, 2. A4, 3. POSTCARD | 1 |
| PRINT QUALITY | 1. STANDARD, 2. HIGH QUALITY, 3. FAST | 1 |
| NUMBER OF SHEETS TO BE PRINTED | THE NUMBER OF SHEETS TO BE PRINTED | 2 |

| USER ID | EMAIL | PRINTER ID | SERIAL NUMBER | MODEL NAME |
|---|---|---|---|---|
| TAROO101 | taro@gsn.com | AAAA11111 | ABCD10 | MFP Z10 |
| JIRO777 | jiro@ff.com | BBBB22222 | ABVC62 | MFP X20 |
| HANA3 | hana@aa.com | CCCC33333 | ABFD07 | MFP K30 |
| SIRO54 | siro@bb.com | DDDD4444 | ABZX23 | MFP Z10 |

| PRINTER ID | RECEPTION DATE/TIME | PRINTING APPLICATION | PRINTING PAPER SIZE | PRINTING PAPER TYPE | PRINT QUALITY | NUMBER OF SHEETS TO BE PRINTED |
|---|---|---|---|---|---|---|
| AAAA11111 | 201812271305 | 004 | 1 | 1 | 1 | 1 |
| BBBB22222 | 201812280935 | 001 | 2 | 2 | 1 | 3 |
| CCCC33333 | 201812302050 | 002 | 3 | 3 | 2 | 10 |
| DDDD4444 | 201901011000 | 005 | 2 | 2 | 3 | 2 |

| PRINTER ID | APPLICATION "A" | APPLICATION "B" | APPLICATION "C" | APPLICATION "D" | OTHER |
|---|---|---|---|---|---|
| AAAA11111 | 0 | 1 | 1 | 30 | 10 |
| BBBB22222 | 30 | 0 | 0 | 0 | 1 |
| CCCC33333 | 0 | 20 | 10 | 100 | 10 |
| DDDD4444 | 0 | 0 | 0 | 0 | 5 |

901

FROM: abc_company.@abc.com
TO: taro@gsn.com

GOOD VALUE NOTIFICATION FROM PRINT POINT SERVICE!

DEAR TARO0101,

NOW, WE ARE PROVIDING POINT-UP PROMOTION WHERE,
IF YOU PERFORM PRINTING FROM YOUR SMARTPHONE,
YOU WILL GET DOUBLE THE USUAL POINTS.

FOR THE INSTALLATION METHOD AND USAGE METHOD OF APPLICATION "A":
https://abc.com/appa/introduction

FROM: abc_company.@abc.com
TO: taro@gsn.com

GOOD VALUE NOTIFICATION FROM PRINT POINT SERVICE!

DEAR TARO0101,

NOW, WE ARE PROVIDING POINT-UP PROMOTION WHERE,
IF YOU PERFORM PRINTING FROM YOUR SMARTPHONE,
YOU WILL GET DOUBLE THE USUAL POINTS.

FOR THE INSTALLATION METHOD AND USAGE METHOD OF APPLICATION "A":
https://abc.com/appa/introduction FOR USERS LIKE YOU WHO PRINTS MANY PHOTOGRAPHS:
https://abc.com/picture/contents

FROM: abc_company.@abc.com
TO: taro@gsn.com

GOOD VALUE NOTIFICATION FROM PRINT POINT SERVICE!

DEAR TARO0101,

NOW, WE ARE PROVIDING POINT-UP PROMOTION WHERE,
IF YOU PERFORM PRINTING FROM YOUR SMARTPHONE,
YOU WILL GET DOUBLE THE USUAL POINTS.

FOR THE INSTALLATION METHOD AND USAGE METHOD OF APPLICATION "A":
https://abc.com/appa/introduction FOR USERS LIKE YOU WHO PRINTS MANY DOCUMENTS:
https://abc.com/service

FIG.11B

INFORMATION PROCESSING SYSTEM PROVIDING A PREDETERMINED NOTIFICATION, INFORMATION PROCESSING METHOD, AND SERVER SYSTEM

BACKGROUND OF THE INVENTION

Field of the Invention

The present invention relates to an information processing system, an information processing method, and a server system for providing a notification of predetermined information according to print processing.

Description of the Related Art

Japanese Patent Laid-Open No. 2004-302955 discloses a point management system for managing points according to the usage situation of a printer. Specifically, the present point management system is a system for allocating points to a user in a case where the user uses a printer in a specific usage condition, for example, in a case where a cartridge of which an operation check has been done by a printing apparatus manufacturer is used.

It is conceivable to provide services to users who satisfy a specific usage condition. However, it is also possible that a user who does not satisfy the specific usage operation does not know a method for satisfying the specific usage condition.

SUMMARY OF THE INVENTION

Therefore, the present invention provides a technology capable of providing a predetermined notification to a user who does not satisfy a specific usage condition.

Therefore, the information processing system of the present invention includes an image forming apparatus configured to form an image, and a server system including one or more servers connected to the image forming apparatus via a network, and the server system includes: a receiving unit configured to receive usage history information of the image forming apparatus and identification information of the image forming apparatus; a storage unit configured to store the identification information and user information of a user who uses the image forming apparatus in association with each other; a first obtaining unit configured to obtain the user information from the storage unit, based on the identification information received by the receiving unit; a second obtaining unit configured to obtain a value of a specific item from the usage history information received by the receiving unit; and a notification unit configured to be capable of notifying the user of predetermined information, based on the user information obtained by the first obtaining unit and the value obtained by the second obtaining unit.

According to the present invention, it is possible to provide a predetermined notification to a user who does not satisfy a specific usage condition.

Further features of the present invention will become apparent from the following description of exemplary embodiments with reference to the attached drawings.

BRIEF DESCRIPTION OF THE DRAWINGS

FIG. 6 is a diagram illustrating a table indicating details of a print log generated by the printer;

FIG. 7A is a diagram illustrating a database stored in a storage device;

FIG. 7B is a diagram illustrating a database stored in a storage device;

FIG. 7C is a diagram illustrating a database stored in a storage device;

FIG. 9 is a diagram illustrating an example of an email sent from the service provider server;

FIG. 11A is a diagram illustrating an email sent from the service provider server; and FIG. 11B is a diagram illustrating an email sent from the service provider server.

DESCRIPTION OF THE EMBODIMENTS

First Embodiment

Hereinafter, an explanation is given of the first embodiment of the present invention with reference to the drawings.

Specifically, there is a case in which a provider of points such as a manufacture changes the point allocation reference, such as a case in which more points than usual are allocated to a user who satisfies a specific usage condition because of a promotion or the like. However, it is also possible that a user who does not satisfy the specific usage operation does not know a method for satisfying the specific usage condition. In that case, the manufacturer desires to provide guidance of a method for satisfying the condition, so as to prompt users who do not satisfy the specific usage condition to obtain the points. Therefore, in the embodiment below, an explanation is given of a technology for providing such guidance to a user.

Figure 1:
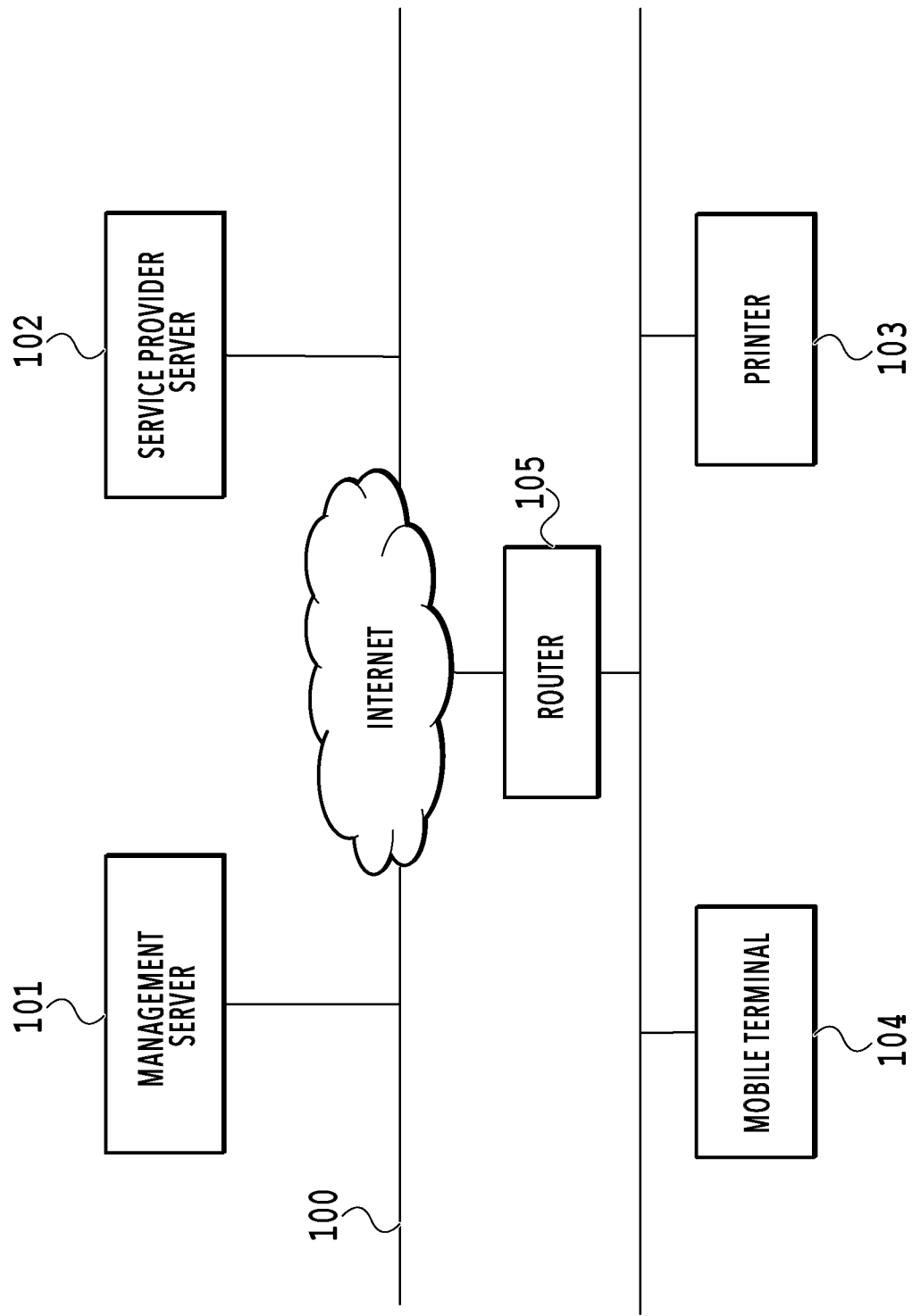
FIG. 1 is a diagram illustrating an example of the system configuration of an information processing system.

FIG. 1 is a diagram illustrating an example of the system configuration of the information processing system according to the present embodiment. The information processing system according to the present embodiment includes a management server 101, a service provider server (service server) 102, a printer 103, which is an image processing apparatus, and a mobile terminal 104, which is an information processing apparatus. Each of the management server 101 and the service provider server 102 is connected to the Internet 100. The mobile terminal 104 and the printer 103 are capable of connecting to the Internet via a router 105.

Note that the printer 103 is also capable of connecting to the mobile terminal 104 via a network such as a LAN provided by the router 105. The management server 101 is capable of receiving information sent from the printer 103, and the management server 101 is capable of managing the received information and providing the information sent from the printer 103 to the service provider server 102 via the Internet 100. For each communication, control through HTTP, XMPP, etc., is performed. Note that, as for the protocol, another protocol may be used.

Figure 2:
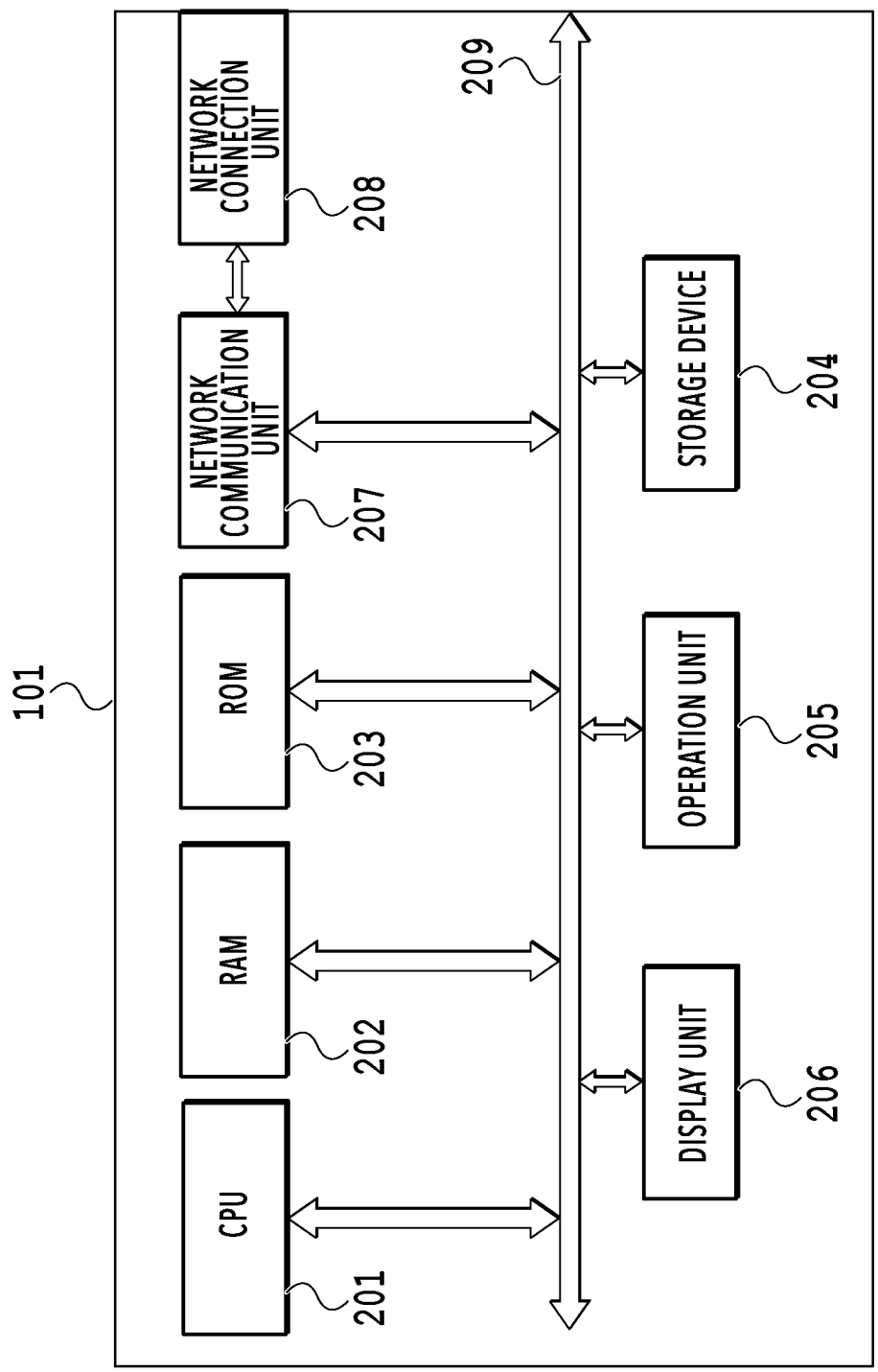
FIG. 2 is a block diagram illustrating the hardware configuration of a management server.

FIG. 2 is a block diagram illustrating an example of the hardware configuration of the management server 101. Since the management server 101 and the service provider server 102 have the same hardware configuration, the management server 101 is taken as an example for explanation here.

The management server 101 includes a CPU 201, a RAM 202, a ROM 203, a storage device 204, a display unit 206, and an operation unit 205. Furthermore, the management server 101 includes a network communication unit 207 and a network connection unit 208. The CPU 201 is a central processing unit that controls each unit of the management server 101. The RAM 202 is a working memory required in a case where the CPU 201 executes a program. The ROM 203 is a read-only memory that stores a boot program required for launching a system.

The storage device 204 is a non-volatile storage device such as a magnetic disk or a flash memory that stores programs to be executed by the CPU 201 and various types of information. The operation unit 205 includes a keyboard, a mouse, etc., for a user to perform various kinds of input operations. The display unit 206 is configured with an LCD, for example, and displays various kinds of information. The network communication unit 207 is connected to a network such as the Internet 100 via the network connection unit 208 and performs various kinds of communications. The respective units described above are mutually connected via a bus 209.

Figure 3:
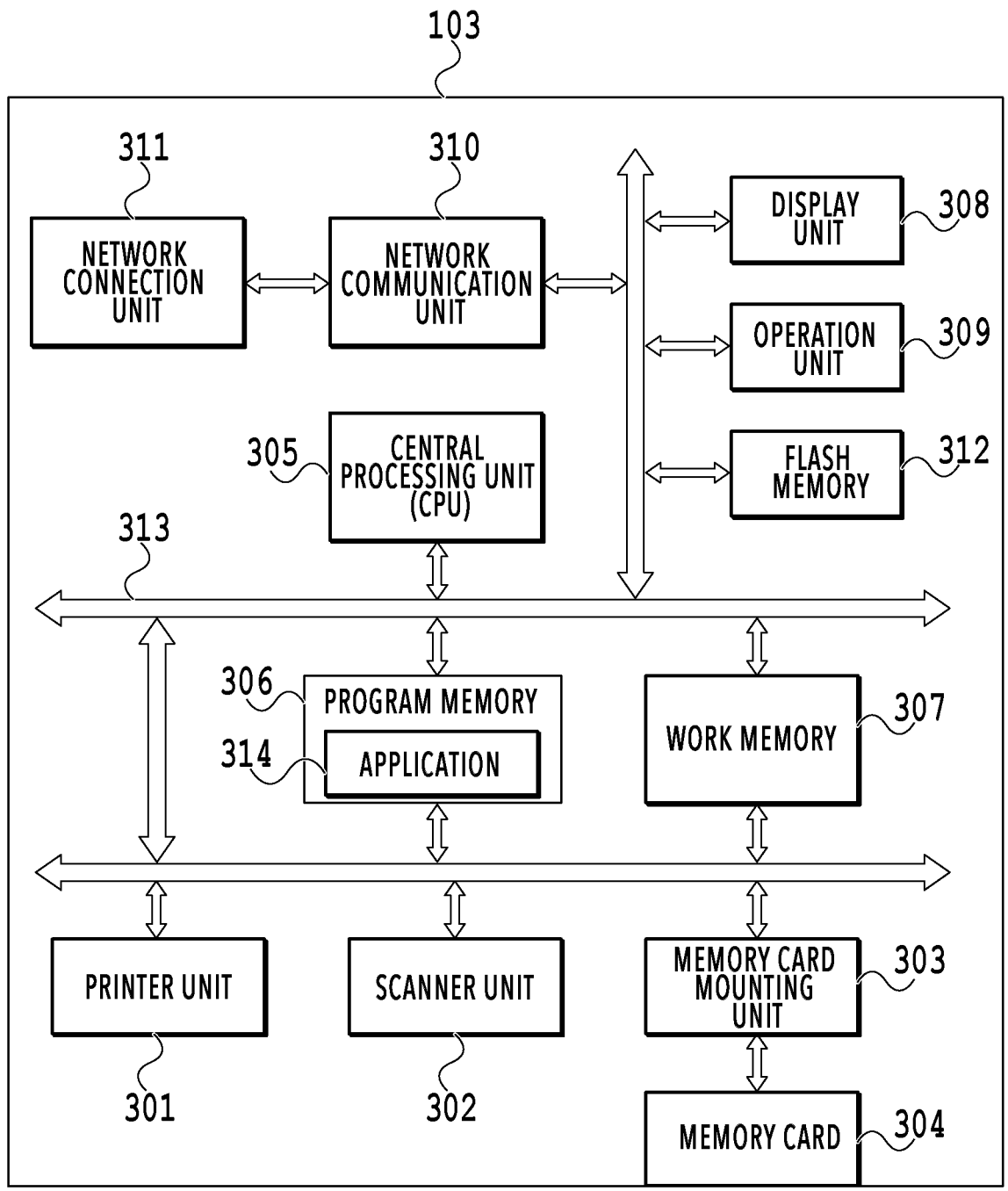
FIG. 3 is a block diagram illustrating an example of the hardware configuration of a printer.

FIG. 3 is a block diagram illustrating an example of the hardware configuration of the printer 103. The printer 103 includes a printer unit 301, a scanner unit 302, a memory card mounting unit 303, and a memory card 304. Further, the printer 103 includes a CPU 305, a program memory 306, a work memory 307, a display unit 308, an operation unit 309, a network communication unit 310, a network connection unit 311, and a flash memory 312. Although the printer 103, which is a multifunctional peripheral, will be taken as an example of the image processing apparatus capable of performing image formation in the explanation of the present embodiment, it is also possible that the image processing apparatus is a copy machine, a facsimile, or the like. Furthermore, it is also possible that the image processing apparatus is a printer without a scanner function.

In the printer 103, the print function is implemented by the printer unit 301, the scanner function is implemented by the scanner unit 302, and the storage function is implemented by the memory card mounting unit 303 and the memory card 304. The printer unit 301 prints image data received from the outside, image data stored in the memory card 304, or the like, on a print sheet by a recording system such as an ink jet system or an electrophotographic system. Further, the printer unit 301 also manages ink information including a remaining ink amount and printing paper information including the number of loaded printing paper.

The scanner unit 302 optically reads a document set on a platen (not illustrated in the drawings) and converts the document into digital data. Further, the scanner unit 302 sends image data, which is converted into a designated file format, to an external apparatus via a network or stores the image data in a storage area (not illustrated in the drawings) such as an HDD. Further, in order to implement copying, the scanner unit 302 reads a document placed on the platen to generate image data and transfers the image data to the printer unit 301, and the printer unit 301 prints the image data on a print sheet. The memory card 304 mounted in the memory card mounting unit 303 stores various kinds of file data. The various kinds of file data can be read out and edited by use of an external apparatus via a network. Further, it is also possible to store file data in the memory card 304 by use of an external apparatus.

The CPU 305 is a central processing unit for controlling each unit in the printer 103. The program memory 306 is configured with a ROM or the like and stores various kinds of program codes and an application 314 for communicating with the management server 101. Further, the application 314 generates a print log from print information (printing paper type, printing paper size, print quality, the number of sheets to be printed, etc.) when printing is completed. The work memory 307 is configured with a RAM or the like and temporarily stores or buffers image data, a job log, etc., when each service is executed. The display unit 308 is configured with an LCD, for example, and displays various kinds of information. The operation unit 309 includes a switch, etc., for a user to perform various kinds of input operations.

The network communication unit 310 is connected to the router 105 via the network connection unit 311. That is, the network communication unit 310 is connected to a network such as the Internet 100 via the network connection unit 311 to perform various kinds of communications. For each communication, control through HTTP, XMPP, etc., is performed. Note that, as for the protocol, another protocol may be used. The flash memory 312 is a non-volatile memory for storing image data, etc., received by the network communication unit 310. The respective units described above are mutually connected by a bus 313.

Figure 4:
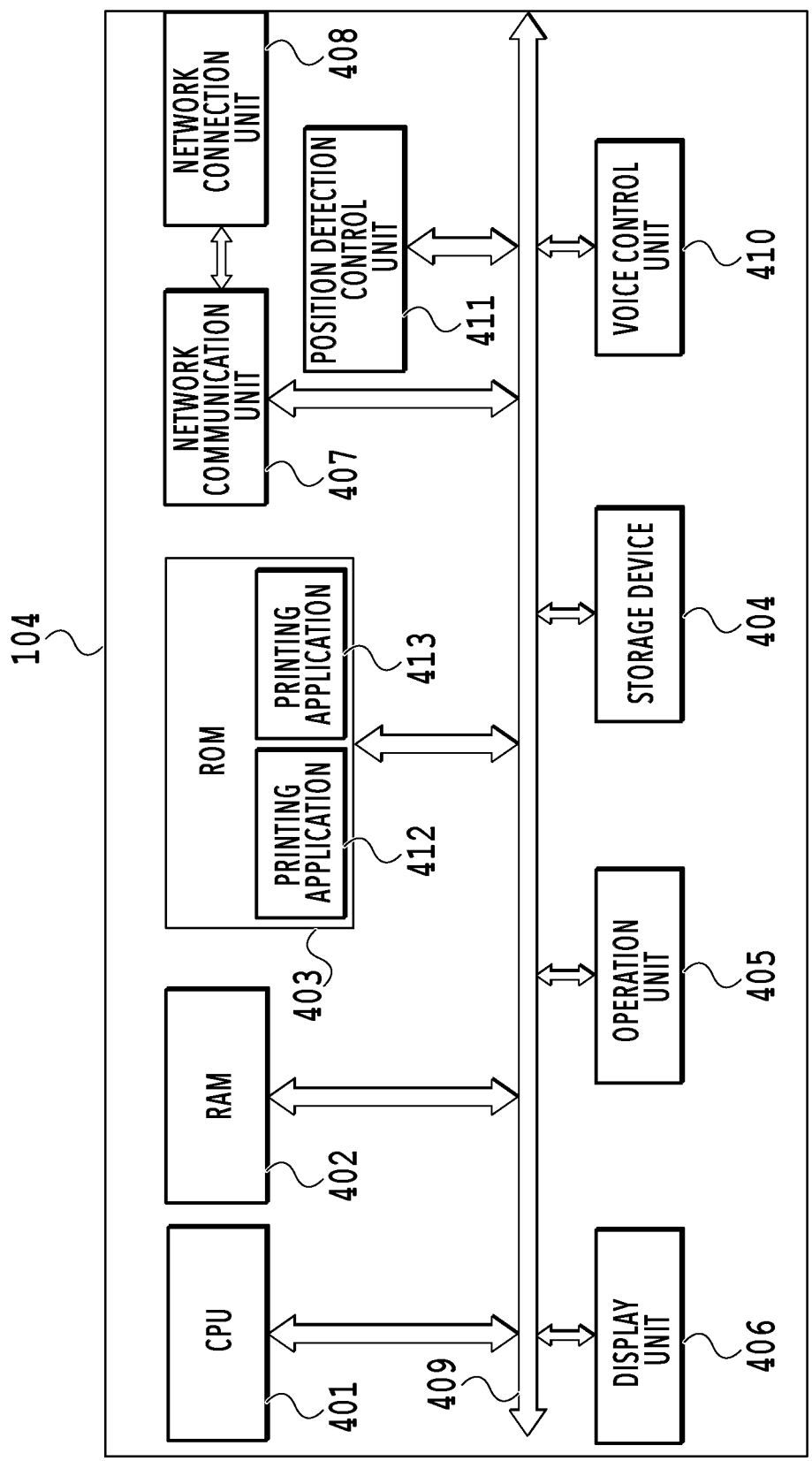
FIG. 4 is a diagram illustrating an example of the hardware configuration of a mobile terminal.

FIG. 4 is a diagram illustrating an example of the hardware configuration of the mobile terminal 104. The mobile terminal 104 includes a CPU 401, a RAM 402, a ROM 403, a storage device 404, an operation unit 405, a display unit 406, a voice control unit 410, and a position detection control unit 411. Furthermore, the mobile terminal 104 includes a network communication unit 407 and a network connection unit 408.

The CPU 401 is a central processing unit for controlling each unit of the mobile terminal 104. The RAM 402 is a working memory required in a case where the CPU 401 executes a program. The ROM 403 stores an operating system and printing applications 412 and 413 for controlling a telephone call and an image processing apparatus, etc., which are read out and executed by the CPU 401. The storage device 404 is a non-volatile storage device, which stores various kinds of operation mode settings that need to be retained even after the mobile terminal 104 is restarted, operation logs, and the like. The operation unit 405 controls information of instructions made by the user via the buttons and the touch panel of the mobile terminal 104. The display unit 406 is configured with an LCD, for example, and displays various kinds of information.

The network communication unit 407 is connected to the router 105 via the network connection unit 408. That is, the network communication unit 407 is connected to a network such as the Internet 100 via the network connection unit 408 and performs various kinds of communications. The network communication unit 407 corresponds to a wireless LAN. The voice control unit 410 is mainly utilized in a case where a call application is launched and the user is making a call.

Audio data is input and output through a microphone and a speaker, and the voice control unit 410 mediates the microphone and the speaker and the control programs thereof. The position detection control unit 411 obtains the position information of the mobile terminal 104 from a GPS sensor and provides the position information to the operating system. The respective units described above are mutually connected via a bus 409. Note that, although the mobile terminal 104 will be taken as an example of the information processing apparatus in the explanation of the present embodiment, the information processing apparatus is not limited as such. For example, a PC may be used as the information processing apparatus.

Next, an explanation is given of processing in which the mobile terminal 104 makes the printer 103 perform printing and then the service provider server 102 registers the print log in a database.

Figure 5:
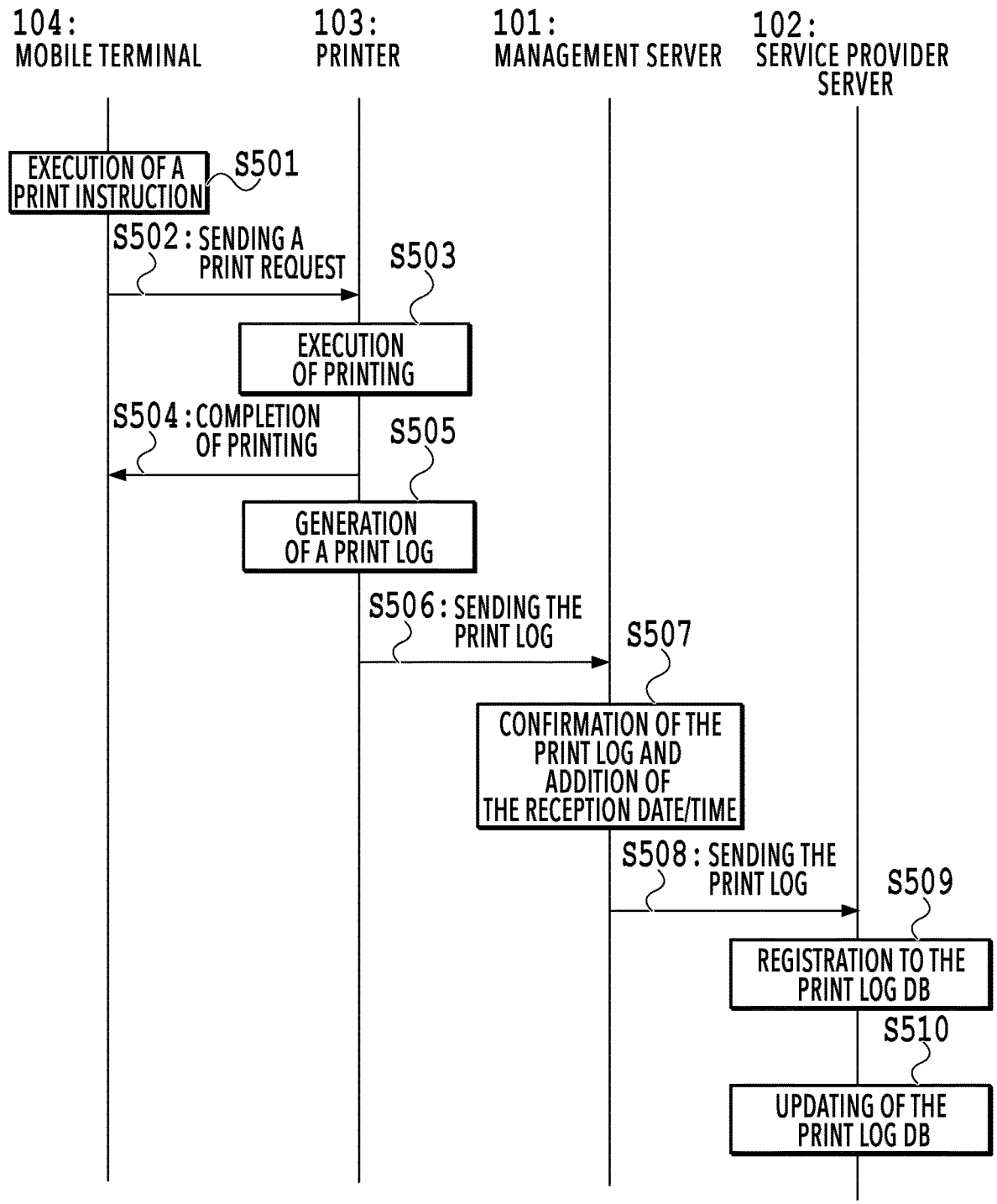
FIG. 5 is a sequence diagram regarding a service provider server receiving a print log.

FIG. 5 is a sequence diagram illustrating the service provider server 102 receiving a print log. Note that, in FIG. 5, the mobile terminal 104 is capable of instructing the printer 103 to perform image formation, and the printer 103 is capable of communicating with the mobile terminal 104 via the router 105 through a network and is connected to the Internet 100. Furthermore, the series of processes illustrated in the sequence of FIG. 5 is performed by the respective CPUs of the mobile terminal 104, the printer 103, the management server 101, and the service provider server 102 retrieving program codes stored in a disk device, etc., into a RAM and executing the program codes.

Alternatively, a part or all of the functions in the steps of FIG. 5 may be implemented by hardware such as an ASIC or an electronic circuit. Note that the symbol "S" in the explanation of each process means that it is a step in the sequence diagram. Hereinafter, the subjects in the respective processes are the CPUs included in the mobile terminal 104, the printer 103, the management server 101, and the service provider server 102.

In a case where the user launches the printing application 412 and makes the mobile terminal 104 issue a print instruction in S501, information indicative of the print instruction from the printing application 412 and a print request including print settings such as the printing paper size and the print quality are sent to the printer 103 in S502. Then, in S503, the printer 103 executes printing according to the print request from the mobile terminal 104. Thereafter, in S504, the printer 103 notifies the mobile terminal 104 that the printing is completed. Then, in S505, the printer 103 generates a print log including information indicating that the printing was instructed from the printing application 412. Note that the print log according to the present invention is characterized in that the value for each log item represents a snapshot of information at the timing of executing printing, not cumulative information.

Here, FIG. 6 is a diagram illustrating a table indicating details of a print log generated by the printer 103 in S505. Hereinafter, the contents of the print log generated by the printer 103 are explained for each item.

PRINTER IDENTIFIER is an identifier for uniquely specifying the printer 103 and is a serial number assigned in advance when the printer is manufactured. MODEL NAME is a character string representing the model name of the printer 103. REMAINING INK AMOUNT is information stored for each color and is configured as a combination of a character string representing a color and a numerical value representing a remaining amount value. There are three types of values according to the remaining amount, which may be "1" in a case of an "INK REMAINING" state, "2" in a case of a "NO INK REMAINING" state, which indicates a state in which ink may have run out, or "3" in a case of an "UNKNOWN" state. As for the value sample "C:1" in FIG. 6, it is indicated that cyan, which is represented by "C", is in the "INK REMAINING" state.

PRINTING APPLICATION represents an application ID indicative of the application from which a print instruction is sent to the printer 103. Note that the application ID is a value uniquely assigned to each printing application of a mobile terminal, a PC, or the like. PRINTING PAPER TYPE represents information such as "1" in a case of a photograph paper, "2" in a case of an ordinary paper, or "3" in a case of a postcard. Similarly, PRINTING PAPER SIZE is "1" in a case of an L (large) size, "2" in a case of A4, or "3" in a case of a postcard. Furthermore, PRINT QUALITY is "1" in a case of "NORMAL", "2" in a case of "HIGH QUALITY", or "3" in a case of "FAST". NUMBER OF SHEETS TO BE PRINTED is information indicative of the number of printed sheets, and, for example, NUMBER OF SHEETS TO BE PRINTED is "5" in a case where a document of five pages is printed. The present information indicates the number of printed surfaces, and blank printing is not counted. Furthermore, multiple-page printing such as 2-in-1 is counted as one sheet per print surface, and double-side printing is counted as two sheets for the front and back sides.

Note that the log items for printing by the printer 103 are not limited to the contents of the present embodiment, and it is also possible that the log items do not include the items listed in FIG. 6, or it is also possible that the log items include other items such as a color/monochrome setting or a usage-starting date of a tank.

Returning to the sequence of FIG. 5, the CPU 201 makes the printer 103 send the generated print log to the management server 101 via the Internet 100 in S506. Thereafter, in S507, the CPU 201 of the management server 101 confirms whether the received print log complies with a predetermined format, and the CPU 201 adds reception date/time information to the print log. In a case where the print log does not comply with the predetermined format, the print log is regarded as an improper log, and the subsequent processing is ended. In S508, the management server 101 sends the print log to the service provider server 102 via the Internet 100.

FIGS. 7A through 7C are diagrams illustrating examples of a database stored in the storage device 204 of the service provider server 102. Hereinafter, an explanation is given of the contents of the database.

The user management database 701 manages users associated with registered printers and stores user information such as an email address of a user, printer identification information such as a printer ID, a serial number of a printer, and a model name of a printer. The printer ID is a given character string that is generated at the timing of service registration, so that the printer is uniquely identified. Note that the data registered in the user management database 701 is data registered at the timing of subscribing to a service and registered by the user at the timing of purchasing a printer, and the information is deleted in a case of cancelling the service subscription. In a case where the service provider server 102 receives a print log to which the reception date/time information is added by the management server 101, the print log is registered in the print log database 702 in association with the printer ID. That is, information such as the printer ID, the reception date/time, the printing application, the printing paper size, the printing paper type, the print quality, and the number of sheets to be printed is stored for each printer. Furthermore, the service provider server 102 stores the printer ID and the number of times printing has been performed by each application in the printing application database 703.

Returning to the sequence of FIG. 5, in S509, the service provider server 102, which has received the print log, detects the serial number of the printer 103, which is included in the print log, so as to obtain the associated printer ID from the user management database 701. Furthermore, the service provider server 102 registers the obtained printer ID and the print log in the print log database 702 in association with each other. Thereafter, in S510, the service provider server 102 obtains printing application information from the print log and searches the printing application database 703 for the printer ID obtained in S509, so as to update the number of times printing has been performed by the corresponding printing application associated with the printer ID.

Figure 8:
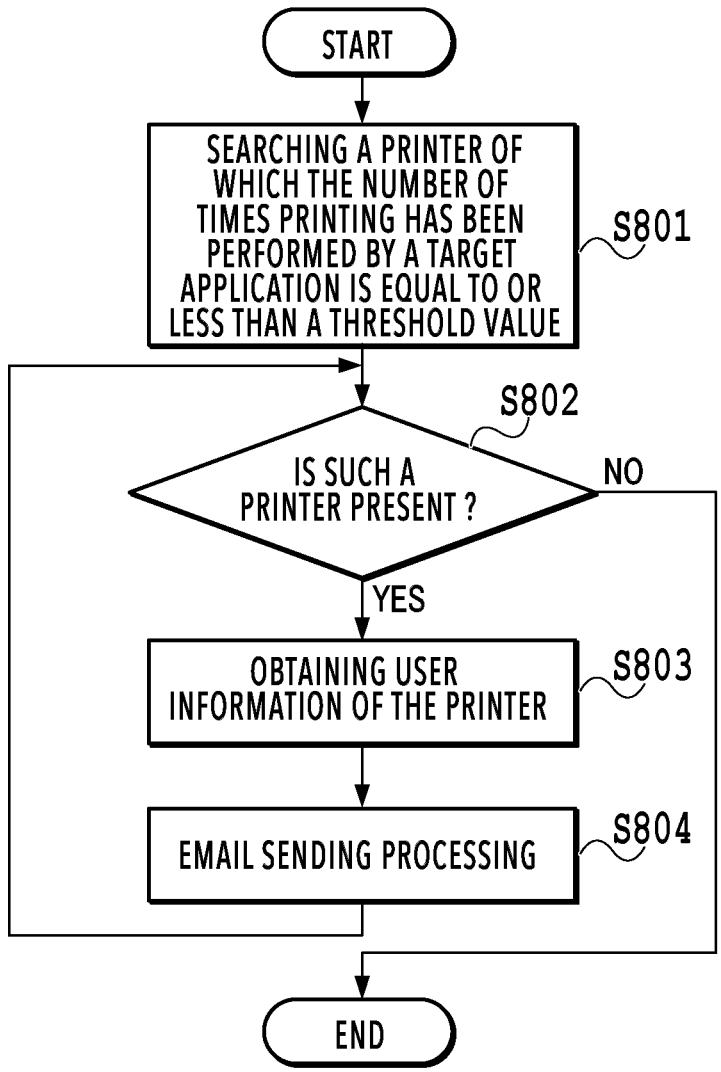
FIG. 8 is a flowchart illustrating email sending processing performed by the service provider server.

FIG. 8 is a flowchart illustrating email sending processing performed by the service provider server 102 of the present embodiment. The email sending processing is processing performed by the service provider server 102, based on the number of times printing has been performed by a printing application, in a case where a service provider such as a manufacturer changes the point allocation reference. Hereinafter, an explanation is given of the email sending processing performed by the service provider server 102 of the present embodiment with reference to the present flowchart. Note that each of the processes explained here is implemented by the CPU 201, which is included in the service provider server 102, reading out a program from the ROM 203 or an external storage device, which is not illustrated in the drawings, and loading the program into the RAM 202, then executing the program.

In a case where the email sending processing is started, in S801, the CPU 201 searches the printing application database 703 for a printer ID of which the number of times printing has been performed by a target application, regarding which the point allocation reference has been changed, is equal to or less than a threshold value. Note that the threshold value is a given value predetermined by the service provider. After that, in S802, the CPU 201 determines whether or not there is any printer ID of which the number of times printing has been performed by the target application is equal to or less than the threshold value. In a case where there is such a printer ID, the processing proceeds to S803, and, in a case where there is no such printer ID, the processing ends. In a case where the processing proceeds to S803, the CPU 201 obtains the user ID and email address corresponding to the printer ID from the user management database 701.

After that, in S804, the CPU 201 sends an e-mail, which includes information indicating that the point allocation reference has been changed and a URL for introducing an installation method and a usage method of the printing application for satisfying the condition, to the obtained email address. Then, the processing returns to S802, and the processing is repeated until there is no printer ID of which the number of times printing has been performed by the target application is equal to or less than the threshold value. The processing ends in a case where there is no printer ID of which the number of times printing has been performed by the target application is equal to or less than the threshold value (equal to or less than a predetermined number of times).

FIG. 9 is a diagram illustrating an example of an email 901 sent from the service provider server 102. In the email 901, information that the point allocation reference has been changed and a URL for introducing an installation method and a usage method of the printing application for satisfying the condition are described. Note that, although only the URL for introducing an installation method and a usage method of one printing application is described in the email 901 of FIG. 9, in a case where multiple printing applications for satisfying the condition are present, it is also possible that installation methods and usage methods of all of the printing applications are described.

Note that, although whether the user satisfies the usage condition is determined based on the number of times printing has been performed by a printing application in the present embodiment, the present embodiment is not limited to as such, and it is also possible that the determination is made based on a condition regarding a specific item. Furthermore, although the notification to the user is sent by email in the present embodiment, the present embodiment is not limited as such, and it is also possible to use another notification means. For example, notification means such as a push notification may be used. Furthermore, although the explanation has been given of the service provider server 102 being capable of providing a notification of a usage condition to the user in the present embodiment, it is also possible that the management server 101 has the function of the service provider server 102.

As described above, a print log including a printer identifier and usage history information regarding the usage history of the printer are obtained, so that guidance of a specific usage condition is provided to the user, based on the obtained print log. Accordingly, it is possible to implement an information processing system, an information processing apparatus, a server and a program capable of providing guidance of a specific usage condition to a user, who does not satisfy the specific usage condition, in a case where the service provider changes the point allocation reference.

Second Embodiment

Hereinafter, an explanation is given of the second embodiment of the present invention with reference to the drawings. Note that the basic configuration of the present embodiment is the same as that of the first embodiment, and therefore only the characteristic configurations are explained below.

Figure 10:
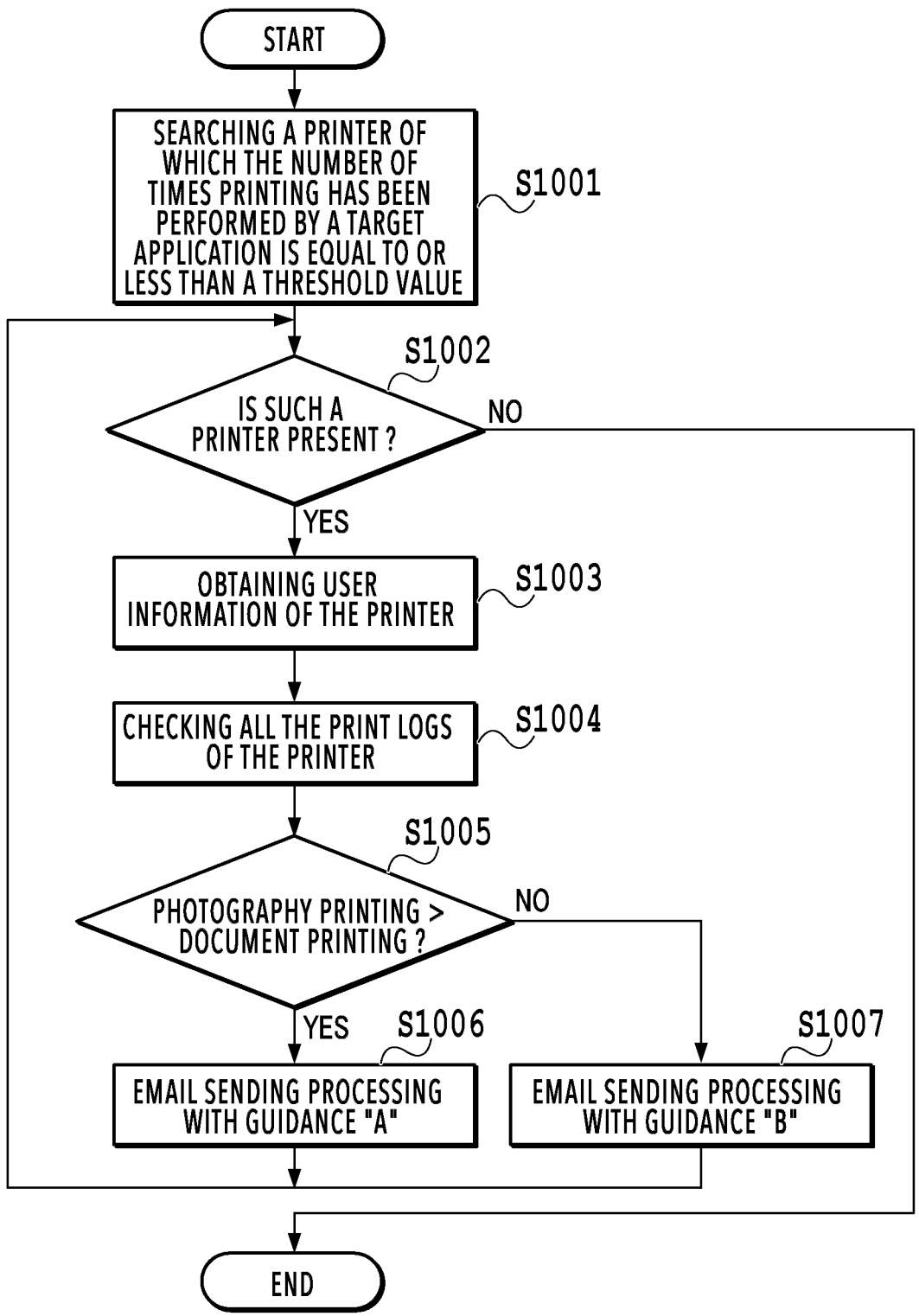
FIG. 10 is a flowchart of email sending processing performed by the service provider server.

FIG. 10 is a flowchart illustrating email sending processing performed by the service provider server 102 of the present embodiment. The email sending processing is processing performed by the service provider server 102, based on the number of times printing has been performed by a printing application and the printing paper type, in a case where a service provider changes the point allocation reference. Hereinafter, an explanation is given of the email sending processing performed by the service provider server 102 of the present embodiment with reference to the present flowchart. Note that each of the processes explained here is implemented by the CPU 201, which is included in the service provider server 102, reading out a program from the ROM 203 or an external storage device, which is not illustrated in the drawings, and loading the program into the RAM 202, then executing the program.

Since the processes from S1001 to S1003 are the same as the processes from S801 to S803 of FIG. 8, the explanations thereof will be omitted. In 51004, the CPU 201 obtains all print logs of the target printer ID from the print log database 702. Thereafter, in S1005, the CPU 201 confirms the printing paper types of all the obtained print logs, and counts as photography printing in a case of a photograph paper and counts as document printing in a case of an ordinary paper, so as to determine whether or not, out of the total number of times printing has been performed, the number of times photography printing has been performed is more than the number of times document printing has been performed. In a case where the total number of times photography printing has been performed is more than the total number of times document printing has been performed, the processing proceeds to S1006, so that an email is sent with contents of GUIDANCE "A", which is selection information. Furthermore, in a case where the total number of times photography printing has been performed is not more than the total number of times document printing has been performed, the processing proceeds to S1007, so that an email is sent with contents of GUIDANCE "B", which is selection information. After the process of S1006 or S1007 is completed, the processing returns to S1002, and the processing is repeated until there is no printer ID of which the number of times printing has been performed by the target application is equal to or less than the threshold value. The processing ends in a case where there is no printer ID of which the number of times printing has been performed by the target application is equal to or less than the threshold value.

FIG. 11A and FIG. 11B are diagrams illustrating examples of emails 1101 and 1102 sent from the service provider server 102. In the email 1101, information that the point allocation reference has been changed, a URL for introducing an installation method and a usage method of the printing application for satisfying the condition, and a URL for providing contents suitable for photography printing are described. Furthermore, in the email 1102, information that the point allocation reference has been changed, a URL for introducing an installation method and a usage method of the printing application for satisfying the condition, and a URL for providing guidance of a site for purchasing consumables and an automatic delivery service of consumables are described.

Note that, although the print type is determined based on the printing paper type in the present embodiment, it is also possible to use another type of information, such as a printing paper size, as long as the information is included in a print log. Furthermore, it is also possible that the contents of the guidance is changed based on information other than the print type.

Moreover, although a notification of two types of information, that is, GUIDANCE "A" or GUIDANCE "B", is provided to the user in the present embodiment, the present embodiment is not limited as such. That is, it is also possible that a notification of information is provided to the user selectively from among multiple types of information.

Note that the above-described management server 101 and service provider server 102 are not limited to separate server devices. For example, it is also possible that one server device has the functions of the management server 101 and the service provider server 102. That is, a server system including one or more server devices may have the functions of the above-described management server 101 and service provider server 102.

Other Embodiments

The present invention can be implemented by processing of supplying a program for implementing one or more functions of the above-described embodiments to a system or an apparatus via a network or a storage medium, so that one or more processors in a computer of the system or the apparatus read out and execute the program. Furthermore, it is also possible to implement the above-described embodiments by use of a circuit (for example, an ASIC) for implementing one or more functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-158831 filed Aug. 30, 2019, which is hereby incorporated by reference herein in its entirety.

What is claimed is:

1. An information processing system including
an image forming apparatus configured to form an image and output usage history information of the image forming apparatus and identification information of the image forming apparatus, and
a server system including one or more servers connected to the image forming apparatus via a network, the server system comprising at least one processor causing the server system to act as:
a receiving unit configured to receive the usage history information of the image forming apparatus and the identification information of the image forming apparatus;
a storage control unit configured to store, in a memory, the identification information and user information in association with each other, the user information including destination information of a notification;
a first obtaining unit configured to obtain the user information from the memory, based on the identification information received by the receiving unit;
a second obtaining unit configured to obtain, from the usage history information received by the receiving unit, a value related to image forming based on an instruction from a predetermined application included in an information processing apparatus capable of communicating with the image forming apparatus; and
a notification unit configured to be capable of outputting a notification including predetermined information, based on the destination information obtained by the first obtaining unit,
wherein the notification including the predetermined information is output in a case where the value does not satisfy a predetermined condition, and the notification including the predetermined information is not output in a case where the value satisfies the predetermined condition.

2. The information processing system according to claim 1, wherein the user information includes an email address of the user as the destination information, and the notification unit outputs the notification of the predetermined information by sending an email to the user based on the email address.

3. The information processing system according to claim 1, wherein the storage control unit stores a plurality of identification information and a plurality of user information in association with each other in the memory.

4. The information processing system according to claim 1,
wherein the value is the number of times the image forming apparatus has performed image forming based on the instruction from the predetermined application.

5. The information processing system according to claim 4, wherein, in a case where the number of times is less than a predetermined number of times, the notification unit outputs the notification including the predetermined information, and in a case where the number of times is more than the predetermined number of times, the notification unit does not output the notification including the predetermined number of times.

6. The information processing system according to claim 5,
wherein the information processing system includes a plurality of image forming apparatuses, and
wherein the processor further causes the server system to act as a determination unit configured to determine whether there is an image forming apparatus of which the number of times is less than the predetermined number of times among the plurality of image forming apparatuses.

7. The information processing system according to claim 1,
wherein the predetermined information is selection information, which is selected from among a plurality of information, and
wherein the notification unit outputs a notification of the selection information selected from among the plurality of information, based on the usage history information.

8. The information processing system according to claim 7, wherein the notification of the selection information selected from among the plurality of information is output based on information regarding a printing paper type included in the usage history information.

9. An information processing method executed by an image forming apparatus configured to form an image and output usage history information of the image forming apparatus and identification information of the image forming apparatus, and a server system including one or more servers connected to the image forming apparatus via a network, the method comprising:
receiving the usage history information of the image forming apparatus and the identification information of the image forming apparatus;
obtaining, from a memory, user information including destination information of a notification, based on the received identification information, the user information having been stored in association with the identification information in the memory;
obtaining, from the received usage history information, a value related to image forming based on an instruction from a predetermined application included in an information processing apparatus capable of communicating with the image forming apparatus; and
outputting a notification including predetermined information, based on the obtained destination information;
wherein the notification including the predetermined information is output in a case where the value does not satisfy a predetermined condition, and the notification including the predetermined information is not output in a case where the value satisfies the predetermined condition.

10. A server system including one or more servers, the server system comprising at least one processor causing the server system to act as:
a receiving unit configured to receive usage history information of an image forming apparatus and identification information of the image forming apparatus;
a storage control unit configured to store, in a memory, the identification information and user information in association with each other, the user information including destination information of a notification;
a first obtaining unit configured to obtain the user information from the memory, based on the identification information received by the receiving unit;
a second obtaining unit configured to obtain, from the usage history information received by the receiving unit, a value related to image forming based on an instruction from a predetermined application included in an information processing apparatus capable of communicating with the image forming apparatus; and
a notification unit configured to be capable of outputting a notification including predetermined information, based on the user destination information obtained by the first obtaining unit;
wherein the notification including the predetermined information is output in a case where the value does not satisfy a predetermined condition, and the notification including the predetermined information is not output in a case where the value satisfies the predetermined condition.

11. The server system according to claim 10, wherein the user information includes an email address of the user as the destination information, and the notification unit outputs the notification of the predetermined information by sending an email to the user based on the email address.

12. The server system according to claim 11, wherein the storage control unit stores a plurality of identification information and a plurality of user information in association with each other in the memory.

13. The server system according to claim 10, wherein the value is the number of times the image forming apparatus has performed image forming based on the instruction from the predetermined application, which is configured to be capable of instructing the image forming apparatus to perform image formation.

14. The server system according to claim 13, wherein, in a case where the number of times is less than a predetermined number of times, the notification unit outputs the notification including the predetermined information, and in a case where the number of times is more than the predetermined number of times, the notification unit does not output the notification including the predetermined number of times.

15. The server system according to claim 14,
wherein the server system comprises a plurality of image forming apparatuses and a determination unit configured to determine whether there is an image forming apparatus of which the number of times is less than the predetermined number of times among the plurality of image forming apparatuses.

16. The server system according to claim 10,
wherein the predetermined information is selection information, which is selected from among a plurality of information, and
wherein the notification unit outputs a notification of the selection information selected from among the plurality of information, based on the usage history information.

17. The server system according to claim 16, wherein the notification of the selection information selected from among the plurality of information is output based on information regarding a printing paper type included in the usage history information.

* * * * *